J. W. LEWIS.
Blacking Box Holder.

No. 31,065.

Patented Jan. 1, 1861.

Witnesses

Inventor
J. W. Lewis

UNITED STATES PATENT OFFICE.

J. W. LEWIS, OF PROVIDENCE, RHODE ISLAND.

BLACKING-BOX HOLDER.

Specification of Letters Patent No. 31,065, dated January 1, 1861.

*To all whom it may concern:*

Be it known that I, JOSEPH W. LEWIS, of Providence, in the county of Providence and State of Rhode Island, have invented a new and Improved Device for Holding Blacking-Boxes; and I do hereby declare that the following is a full, clear, and exact description thereof, reference being had to the accompanying drawings, making a part of this specification, in which—

Figure 1:
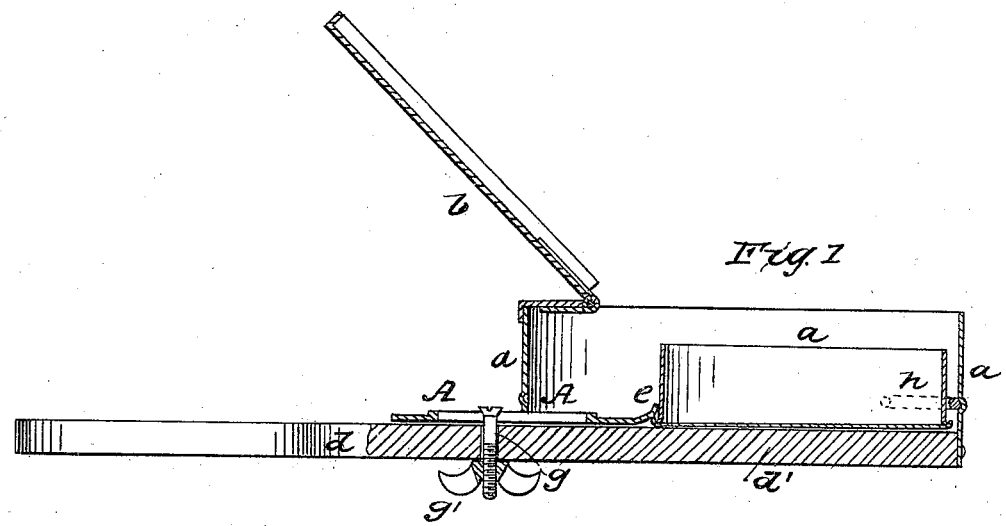
Figure 2:
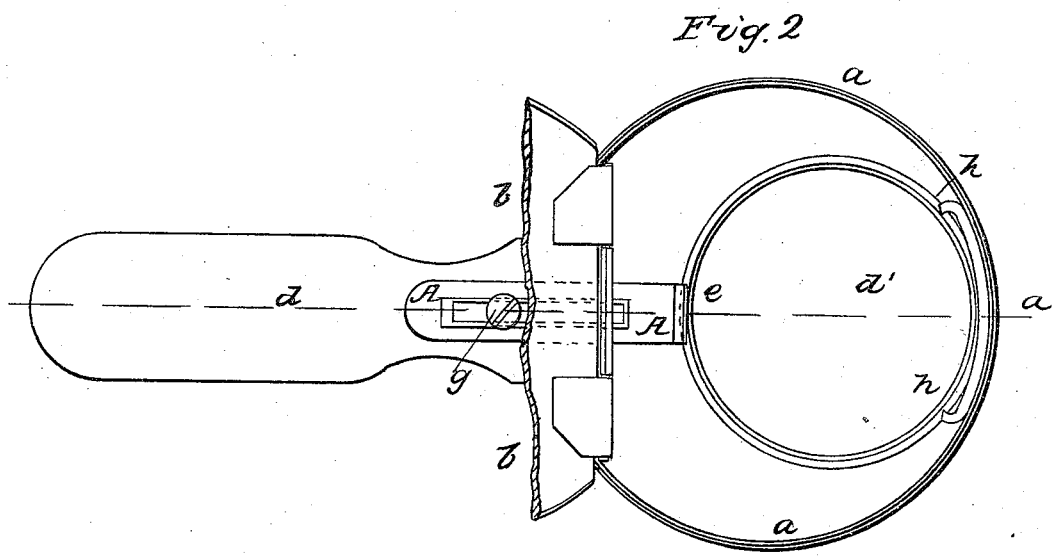

Figure 1 is a longitudinal vertical section taken through the improved blacking box holder showing the interior of the device. Fig. 2 is a top view of the holder with the lid raised and partially broken off to show the adjustable holding bar.

Similar letters of reference indicate corresponding parts in both figures.

This invention is intended for holding and inclosing shoe blacking boxes to prevent the fingers from becoming soiled in using such boxes, and more especially to keep the blacking free from dust and dirt, by closing up the entire blacking box when it is not in immediate use.

To enable those skilled in the art to make and use my invention I will proceed to describe its construction and operation.

In the drawings a, is a circular box which has a hinged cover b, and which is sufficiently large in diameter to receive and contain a large sized blacking box. This box a, is made of tin or of any suitable sheet metal and it may be stamped up in any desirable ornamental figure.

The handle d, is made of wood and one end of this handle is cut out in a circular shape and made to serve as the bottom of the box a, the lower edge of which box fits over the circular portion d', and is tacked to the edge of this portion d'. The handle portion d, projects through a space which is cut through the side of the box a, and is of a suitable length to be conveniently held in the hand.

A is a slotted plate with a tooth or lip e, formed on one end which end projects within the box a. The plate A, passes through a hole which is cut through the box a, and this plate is held in its place on the top of the handle d, by a button head bolt g, which passes through the slot in said plate and down through the handle d, and a thumb nut g', which screws on the end of the bolt g, and draws the head of this bolt down tightly on the plate A. This slotted plate A, may be adjusted lengthwise, and in a direction with the length of handle portion d, by loosening the thumb nut g', and after thus adjusting the plate it may be secured rigidly in the desired position. Opposite to the holding end e, of plate A, and soldered or otherwise suitably attached to the inside of box a, are two projecting points h, h, which are set at a suitable distance apart and at such a height above the bottom d', that they will grasp the side of a blacking box and together with the tooth e, on plate A, hold the box securely on the bottom of box a. The slot in plate A, is of a sufficient length to allow the plate to be adjusted to any of the ordinary sized blacking boxes.

From this description it will be seen that the blacking box, when secured on the bottom of box a, between the clamps A, and h, h, will be inclosed within a box having a hinged cover which box being made tight will exclude dust and dirt, consequently it will not be necessary to cover the blacking with the top of its box and therefore the objection to removing and replacing this cover is obviated and the fingers are not soiled in using the blacking.

I am aware that an implement for holding blacking boxes on the end of a handle, by means of clamps is not new, and I do not broadly claim such; but

Having thus described my invention, I claim and desire to secure by Letters Patent as an improved article of manufacture—

A blacking box holder constructed with an inclosing box a, hinged cover b, adjustable, slotted clamping plate A, and otherwise made as herein shown and described.

J. W. LEWIS.

Witnesses:
M. M. LIVINGSTON,
JAMES LAIRD.